United States Patent
Weinfield

(10) Patent No.: US 10,319,236 B2
(45) Date of Patent: Jun. 11, 2019

(54) EFFICIENT DSRC CONGESTION CONTROL CERTIFICATION TOOL

(71) Applicants: Denso International America, Inc., Southfield, MI (US); DENSO CORPORATION, Kariya, Aichi-pref. (JP)

(72) Inventor: Aaron D. Weinfield, Encinitas, CA (US)

(73) Assignees: DENSO International America, Inc., Southfield, MI (US); DENSO CORPORATION, Kariya, Aichi-pref. (JP)

(*) Notice: Subject to any disclaimer, the term of this patent is extended or adjusted under 35 U.S.C. 154(b) by 40 days.

(21) Appl. No.: 15/670,431

(22) Filed: Aug. 7, 2017

(65) Prior Publication Data
US 2019/0043360 A1    Feb. 7, 2019

(51) Int. Cl.
*G08G 1/00* (2006.01)
*G08G 1/16* (2006.01)

(52) U.S. Cl.
CPC ............ *G08G 1/163* (2013.01); *G08G 1/164* (2013.01); *G08G 1/20* (2013.01)

(58) Field of Classification Search
CPC ........... G08G 1/20; G08G 1/163; G08G 1/164
USPC ......................................................... 701/36
See application file for complete search history.

(56) References Cited

U.S. PATENT DOCUMENTS

| | | | |
|---|---|---|---|
| 7,165,174 B1* | 1/2007 | Ginter | G06F 21/10 705/51 |
| 7,653,394 B2* | 1/2010 | McMillin | H04L 45/00 455/444 |
| 9,888,337 B1* | 2/2018 | Zalewski | H04L 67/10 |
| 9,911,290 B1* | 3/2018 | Zalewski | G07G 1/0072 |
| 2005/0226201 A1* | 10/2005 | McMillin | H04L 45/00 370/348 |
| 2007/0087756 A1* | 4/2007 | Hoffberg | G06Q 10/0631 455/450 |
| 2007/0106431 A1* | 5/2007 | Tsuzuki | G08G 1/161 701/1 |
| 2007/0299565 A1* | 12/2007 | Oesterling | G07C 5/008 701/1 |
| 2008/0148374 A1* | 6/2008 | Spaur | B60R 25/04 726/6 |
| 2010/0267344 A1* | 10/2010 | Guner | H04W 52/322 455/67.11 |
| 2013/0210460 A1* | 8/2013 | Subramanian | B61L 15/0027 455/456.3 |
| 2013/0279393 A1* | 10/2013 | Rubin | H04J 3/1694 370/312 |

(Continued)

*Primary Examiner* — Atul Trivedi
(74) *Attorney, Agent, or Firm* — Harness, Dickey & Pierce, P.L.C.

(57) ABSTRACT

A certification tool configured to communicate with a dedicated short range communication system includes a vehicle identification unit, a message generation unit, and a communication unit. The vehicle identification unit generates unique vehicle identifications for a target number of remote vehicles. The message generation unit generates messages at a target number of transmitted messages per second for each remote vehicle, and the communication unit communicates the messages to the test vehicle to achieve a target congestion level.

20 Claims, 8 Drawing Sheets

(56) References Cited

U.S. PATENT DOCUMENTS

| | | | | |
|---|---|---|---|---|
| 2013/0279491 | A1* | 10/2013 | Rubin | G08G 1/166 370/347 |
| 2014/0114532 | A1* | 4/2014 | Choi | G08G 1/167 701/36 |
| 2014/0277932 | A1* | 9/2014 | Prakah-Asante | B60K 28/02 701/36 |
| 2014/0306834 | A1* | 10/2014 | Ricci | B60Q 1/00 340/902 |
| 2014/0309849 | A1* | 10/2014 | Ricci | B60Q 1/00 701/33.4 |
| 2015/0018027 | A1* | 1/2015 | Noh | H04W 84/18 455/502 |
| 2015/0156662 | A1* | 6/2015 | Bai | H04W 4/027 370/231 |
| 2015/0227890 | A1* | 8/2015 | Bednarek | G06Q 10/08355 705/26.81 |
| 2015/0228004 | A1* | 8/2015 | Bednarek | G06Q 30/0633 705/26.8 |
| 2015/0274293 | A1* | 10/2015 | Heusinger | B64C 15/00 701/36 |
| 2016/0096530 | A1* | 4/2016 | Catania | B60W 40/08 701/36 |
| 2016/0104377 | A1* | 4/2016 | French | H04H 20/55 701/117 |
| 2016/0107653 | A1* | 4/2016 | Fung | B60W 40/09 701/41 |
| 2016/0286627 | A1* | 9/2016 | Chen | H05B 37/0245 |
| 2016/0286629 | A1* | 9/2016 | Chen | H05B 37/0272 |
| 2017/0024500 | A1* | 1/2017 | Sebastian | G01M 17/007 |
| 2017/0193822 | A1* | 7/2017 | Song | G08G 1/096791 |
| 2018/0376357 | A1* | 12/2018 | Tavares Coutinho | H04W 24/04 |

* cited by examiner

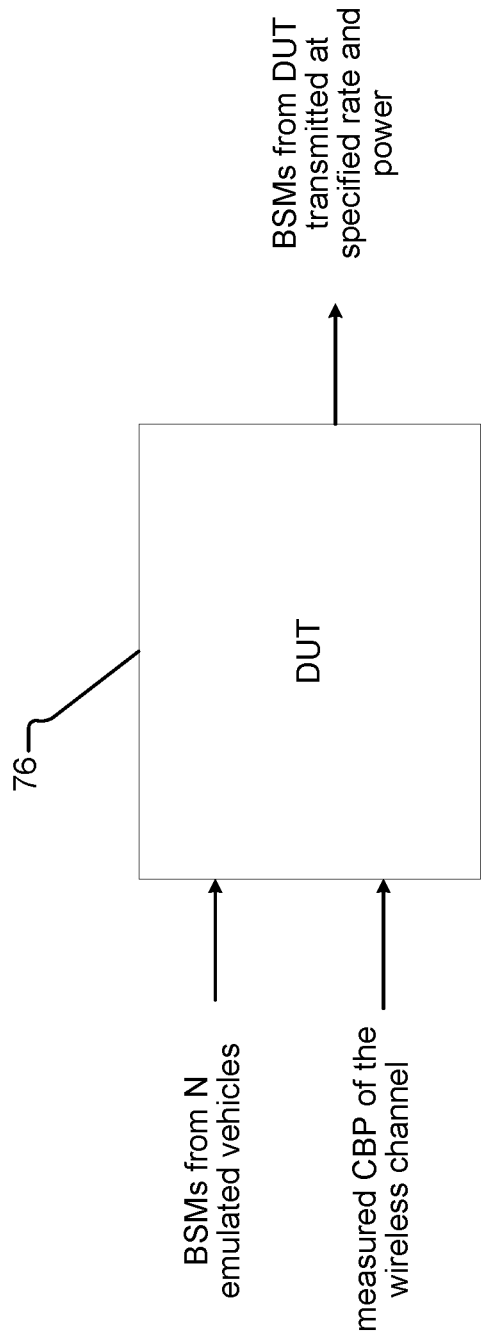

EFFICIENT DSRC CONGESTION CONTROL CERTIFICATION TOOL

FIELD

The present disclosure relates to certification tools for a dedicated short range communication (DSRC) device, and, more particularly, to an efficient DSRC congestion control certification tool and certification method.

BACKGROUND

This section provides background information related to the present disclosure which is not necessarily prior art.

Vehicle to vehicle (V2V), vehicle to infrastructure (V2I), collectively referred to as V2X, technology relies on vehicles transmitting Basic Safety Messages (BSM) over a dedicated short range communications (DSRC) radio to all other surrounding vehicles in the vicinity. The SAE J2945/1 document defines the rules to be used when transmitting BSMs. Due to wireless channel capacity limitations, a congestion control algorithm has been defined to control how often BSMs can be transmitted and what transmit power should be used when the message is transmitted. In low congestion conditions, vehicles will transmit more often (for example, at 10 hertz) and with higher transmit power, while in higher congested conditions, vehicles will transmit less often (for example, at 1 or 2 hertz) and/or with lower transmit power.

Currently, V2X congestion control algorithms have been developed and tested either in simulation environments or using complex test beds with hundreds of devices transmitting enough packets to create the necessary congestion. The device under test is then analyzed and confirmed to be transmitting at the desired rate and with the desired transmit power under different levels of congested environments.

SUMMARY

This section provides a general summary of the disclosure, and is not a comprehensive disclosure of its full scope or all of its features.

A certification tool configured to communicate with a dedicated short range communication system includes a vehicle identification unit, a message generation unit, and a communication unit. The vehicle identification unit generates unique vehicle identifications for a target number of remote vehicles. The message generation unit generates messages at a target number of transmitted messages per second for each remote vehicle, and the communication unit communicates the messages to the test vehicle to achieve a target congestion level.

The certification tool may further include a message generation unit that generates messages at a target packet error rate and a target channel busy percentage.

The certification tool may further include a message generation unit that achieves the target channel busy percentage by adjusting a message size of the messages.

The certification tool may further include a message generation unit that achieves the target channel busy percentage by generating basic safety messages and messages other than basic safety messages for transmission to the test vehicle.

The certification tool may further include a message generation unit that generates messages with missing sequence numbers to achieve the target packet error rate.

The certification tool may further include a message generation unit that achieves the packet error rate by generating messages with sequential sequence numbers but only sending a portion of the generated messages for transmittal to the test vehicle.

The certification tool may further include a communication unit that receives basic safety message transmissions from the test vehicle and determines a basic safety message transmission rate and a basic safety message transmission power for the basic safety messages transmitted from the test vehicle.

The certification tool may further include a communication unit that communicates the messages to the test vehicle to achieve a target congestion level, where the target congestion level is a target channel busy percentage, and the target channel busy percentage is achieved by adjusting a message size of the basic safety messages or by generating messages other than basic safety messages for transmission to the test vehicle.

The certification tool may further include a display control unit that displays status information related to the certification test and remote vehicle state and displays a basic safety message transmission rate and a basic safety message transmission power for basic safety messages transmitted from the test vehicle.

The certification tool may further include a communication unit that determines the basic safety message transmission rate and the basic safety message transmission power for the test vehicle from information contained in the basic safety messages sent by the test vehicle.

The certification tool may further include a communication unit that determines the basic safety message transmission power by measuring a received signal strength and comparing the signal strength to a known or expected range of values.

The certification tool may further include a communication unit that compares the basic safety message transmission rate and the basic safety message transmission power for the test vehicle to a target basic safety message transmission rate and a target basic safety message transmission power. If the basic safety message transmission rate and the basic safety message transmission power for the test vehicle meet or exceed the target basic safety message transmission rate and the target basic safety message transmission power, respectively, the display control unit displays a pass indicator. If the basic safety message transmission rate and the basic safety message transmission power for the test vehicle do not meet or exceed the target basic safety message transmission rate and the target basic safety message transmission power, respectively, the display control unit displays a fail indicator.

The certification tool may further include a vehicle identification unit that either commands a user to input a unique source address and a unique security certificate for each remote vehicle or generates a unique source address and a unique security certificate for each remote vehicle.

A method for certifying a dedicated short range communication system on a test vehicle includes generating, by a certification tool, a unique vehicle identification for each of a target number of remote vehicles; generating, by the certification tool, a plurality of messages at a target number of transmitted messages per second for each of the remote vehicles; and communicating, by the certification tool, the plurality of messages to the test vehicle to achieve a target congestion level.

The method may further include generating, by the certification tool, messages at a target packet error rate and a target channel busy percentage.

The method may further include achieving the target channel busy percentage by adjusting, by the certification tool, a message size of the messages or by generating by the certification tool, basic safety messages and messages other than basic safety messages for transmission to the test vehicle.

The method may further include achieving the target packet error rate by generating, by the certification tool, messages with missing sequence numbers or by generating, by the certification tool, messages with sequential sequence numbers but only sending a portion of the generated messages for transmittal to the test vehicle.

The method may further include receiving, from the test vehicle, basic safety message transmissions and determining, by the certification tool, a basic safety message transmission rate and a basic safety message transmission power for the basic safety messages from the test vehicle.

The method may further include displaying, by the certification tool, status information related to the certification test and remote vehicle state and displaying a basic safety message transmission rate and a basic safety message transmission power for the test vehicle.

The method may further include comparing, by the certification tool, the basic safety message transmission rate and the basic safety message transmission power for the test vehicle to a target basic safety message transmission rate and a target basic safety message transmission power; displaying, by the certification tool, a pass indicator if the basic safety message transmission rate and the basic safety message transmission power for the test vehicle meet or exceed the target basic safety message transmission rate and the target basic safety message transmission power, respectively; and displaying, by the certification tool, a fail indicator if the basic safety message transmission rate and the basic safety message transmission power for the test vehicle do not meet or exceed the target basic safety message transmission rate and the target basic safety message transmission power, respectively.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4B is a detailed block diagram of a portion of the block diagram in FIG. 3.

Corresponding Reference Numerals Indicate Corresponding Parts Throughout the Several Views of the Drawings.

DETAILED DESCRIPTION

Example embodiments will now be described more fully with reference to the accompanying drawings.

As previously stated, current V2X (collectively vehicle to vehicle and vehicle to infrastructure) congestion control algorithms have been developed and tested either in simulation environments or using complex test beds with hundreds of devices transmitting enough packets to create the necessary congestion. This undertaking can be very costly, in part due to the necessity of hundreds of devices to create the congestion. The efficient dedicated short range communication (DSRC) congestion control certification tool and certification method described herein provides a cost effective solution that is simple to set up and does not require many separate test apparatuses in the test bed. The efficient DSRC congestion control certification tool and certification method confirms that a device under test meets the congestion control requirements defined in SAE J2945/1 without the use of hundreds of devices. Instead, one, or in some cases up to five, test tools can be used in the verification. The test tool and certification method can be used in certification testing in the automotive industry or other agencies involved in certification.

Figure 1A:
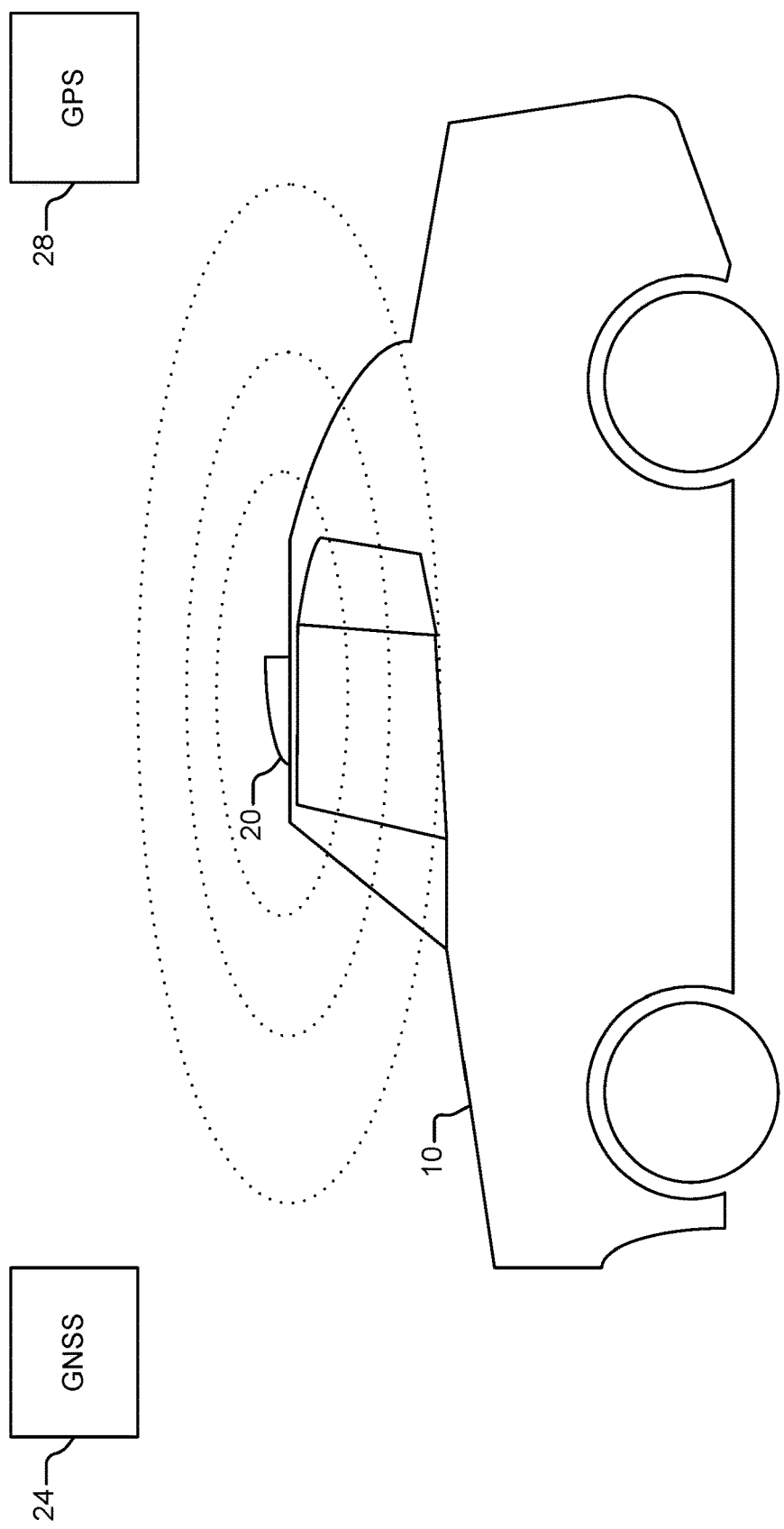
FIG. 1A is an illustration of a vehicle including a DSRC system.

With reference to FIG. 1A, a vehicle 10 (later referred to as a test vehicle or device-under-test) having vehicle to vehicle (V2V) and vehicle to infrastructure (V2I), collectively referred to as V2X, safety technology is shown. In the example embodiment, a vehicle, or host vehicle, 10 is equipped with a dedicated short range communication (DSRC) system 20. The DSRC system 20 may be configured to transmit and receive signals representing, for example, early warnings of accidents and driving hazards to/from remote vehicles that are also equipped with V2X systems and/or to/from an infrastructure communication location equipped with a V2X system. Additionally, the DSRC system 20 may be configured to predict future accidents and driving hazards based on communication with remote vehicles and/or infrastructure communication locations that are also equipped with V2X systems by calculating the current and future positions of the vehicle 10.

The DSRC system 20 may receive information from Global Network Satellite Systems (GNSS) 24 and/or Global Positioning Systems (GPS) 28, which communicate with the DSRC system 20, along with Basic Safety Messages (BSM) periodically transmitted by other vehicles and/or infrastructure containing the current position, position accuracy, speed, heading, brake status, and other vehicle and/or infrastructure information. The SAE J2735 document defines the BSMs that may be utilized and the frequency and power with which the BSMs are transmitted. With V2X technology, vehicles can have improved safety by knowing more about the other surrounding vehicles and infrastructure.

The DSRC system 20 may communicate with the other vehicles or infrastructure equipped with a V2X system, for example, by using a 75 MHz band around a 5.9 GHz signal. While a 75 MHz band around a 5.9 GHz signal is provided as an example embodiment, it is understood that the DSRC system 20 may communicate with the other vehicles by any method including at signals other than the 5.9 GHz signal. All of the components of the DSRC system 20 may be located at one or multiple locations on the roof of the vehicle. Alternatively, some of the components may be located in the interior of the vehicle 10. While the DSRC system 20 is illustrated as being located on the roof of the vehicle 10, in some embodiments, the DSRC system 20, and any or all of its components, may be disposed at any location on the vehicle 10 to include the front, rear, and sides of the vehicle 10.

Figure 1B:
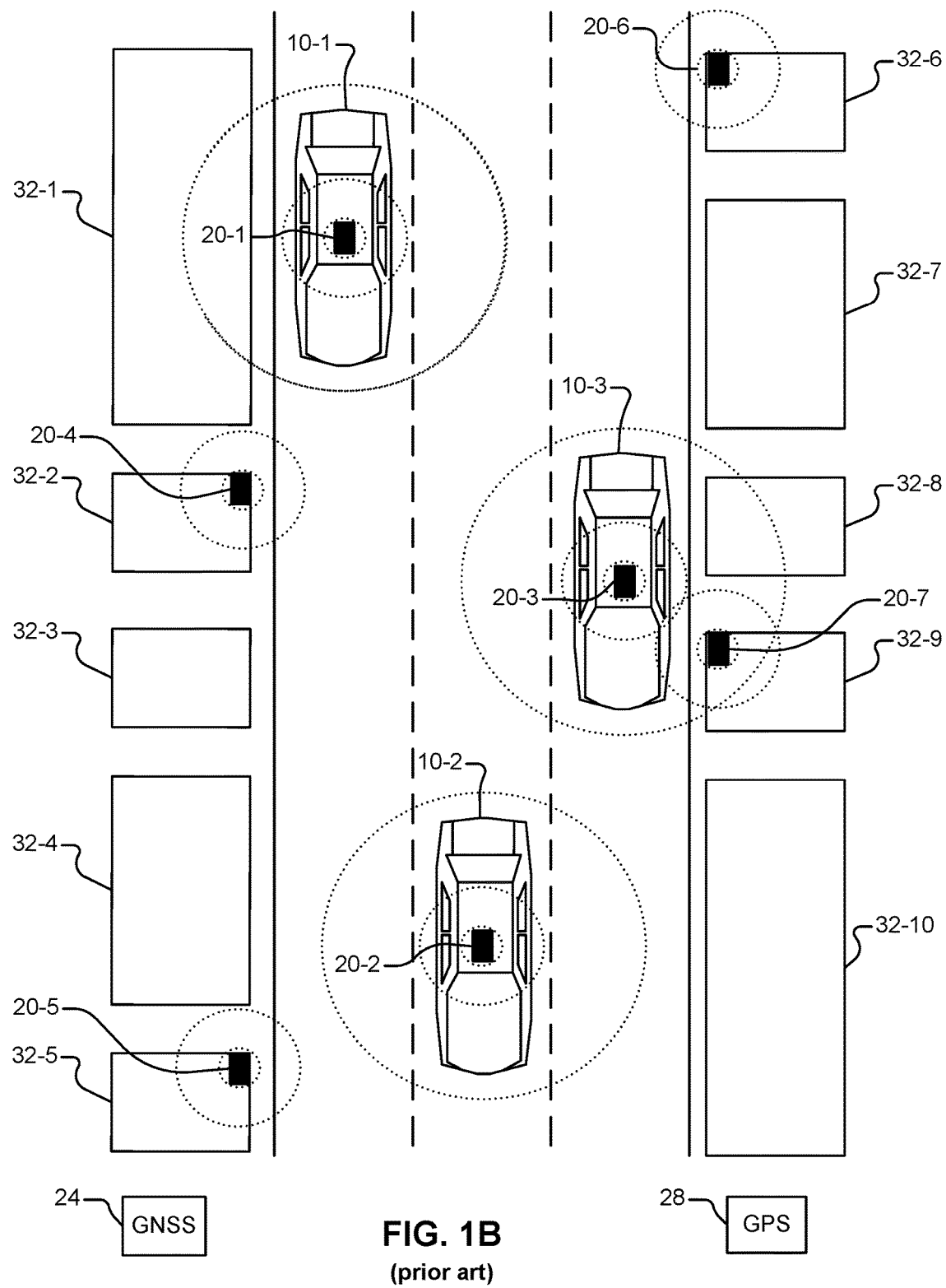
FIG. 1B is an illustration of several vehicles having DSRC systems in an urban environment.

With reference to FIG. 1B, a plurality of vehicles and infrastructure with V2X safety technology is shown. In the example embodiment, vehicles, or remote vehicles, 10-1, 10-2, 10-3 (collectively referred to as vehicles 10) are respectively equipped with DSRC systems 20-1, 20-2, 20-3 (collectively referred to as DSRC systems 20). Infrastructures 32-1, 32-2, . . . , 32-10 (collectively referred to as infrastructures 32) may or may not include DSRC systems. For example, a portion of infrastructures 32 may include DSRC systems 20-4, 20-5, 20-6, 20-7 (included with the collective DSRC systems 20). The DSRC systems 20 may operate in both line-of-sight (LOS) and non-line-of-sight (NLOS) conditions, thereby allowing the DSRC systems 20 of the vehicles 10 and infrastructures 32 to communicate warnings and driving hazards, even with blockage from intervening vehicles, blind corners, or other roadside infrastructure. DSRC signals from each of the DSRC systems 20 are illustrated radiating outward in a circular pattern, as indicated by dotted circles in FIG. 1B.

In urban environments, such as the one pictured in FIG. 1B, vehicle congestion is often high, impairing the ability of the vehicles 10 to communicate BSMs with other DSRC enabled vehicles. The SAE J2945/1 document defines the rules for transmitting BSMs. Due to wireless channel capacity limitations, a congestion control algorithm has been defined to control how often BSMs can be transmitted and what transmit power should be used when the message is transmitted. In low congestion conditions, vehicles will transmit more often (for example only, at 10 hertz) and with higher transmit power, while in higher congested conditions, vehicles will transmit less often (for example only, at 1 or 2 hertz) and/or with lower transmit power.

In current practice, the host vehicle's 10 DSRC system 20 is certified according to SAE J2945/1 to confirm that a device under test transmits the required number of BSMs and the required power level. In low congestion conditions, vehicles transmit BSMs more often (for example, at 10 hertz) and with higher transmit power (for example, 20 decibel-milliwatts or dBm), and in high congestion conditions vehicles transmit BSMs less often (for example, at 1 or 2 hertz) and/or with lower transmit power (for example, 10 dBm). A low congestion condition may be, for example, fewer than 25 remote vehicles and a channel busy percentage (CBP) less than 50%, while a high congestion condition may be, for example, anything greater than the low congestion condition, increasing up to 150 or more remote vehicles and 80% CBP. To certify that the DSRC system 20 on the vehicle 10 operates correctly under the high congestion condition, currently hundreds of devices are necessary to transmit BSMs to a host vehicle 10 to create the necessary congestion because each BSM must come with a unique vehicle ID. The necessity of hundreds of devices renders the certification testing extremely expensive. Further, the efforts required to coordinate and time the messages sent by the hundreds of devices is difficult. Thus, the certification testing is impractical.

The present disclosure describes an efficient DSRC congestion control certification tool for use in certifying a host vehicle's 10 DSRC system 20 according to SAE J2945/1. The DSRC congestion control certification tool has the capability to certify the DSRC system 20 without using hundreds of devices or extensive coordination of messages and devices. Thus, the DSRC congestion control certification tool described herein provides a much easier, and significantly less expensive, option for DSRC system certification.

Figure 2:
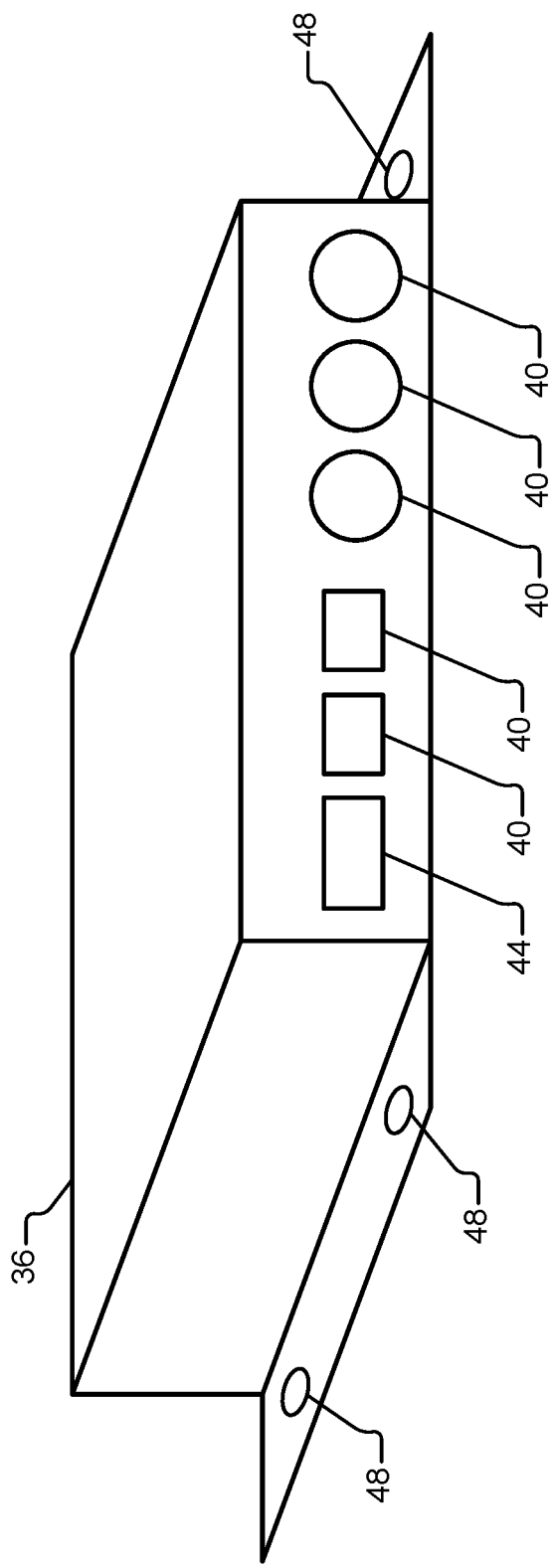
FIG. 2 is a perspective view of a DSRC congestion control certification tool according to the present teachings.

Now referring to FIG. 2, an efficient DSRC congestion control certification tool 36 is illustrated. The DSRC congestion control certification tool 36 may communicate with the DSRC system 20 on the host vehicle 10 to test and certify the DSRC system 20. The DSRC congestion control certification tool 36 may include input and output terminals 40 for connecting to a computer, such as a personal computer, a laptop, a tablet, or any other computing device. The DSRC congestion control certification tool 36 may also include a window 44 for transmitting signals to the DSRC system 20 on the host vehicle 10 (i.e., the DSRC congestion control certification tool 36 may wirelessly connect to the DSRC system 20 on the host vehicle 10). In alternative embodiments, the DSRC congestion control certification tool 36 may connect to the vehicle 10 through a wire which is connected to the DSRC congestion control certification tool 36 using one of terminals 40. Additionally, the DSRC congestion control certification tool 36 may include holes 48 for fasteners (not pictured) to secure the DSRC congestion control certification tool 36 to a surface.

Figure 3:
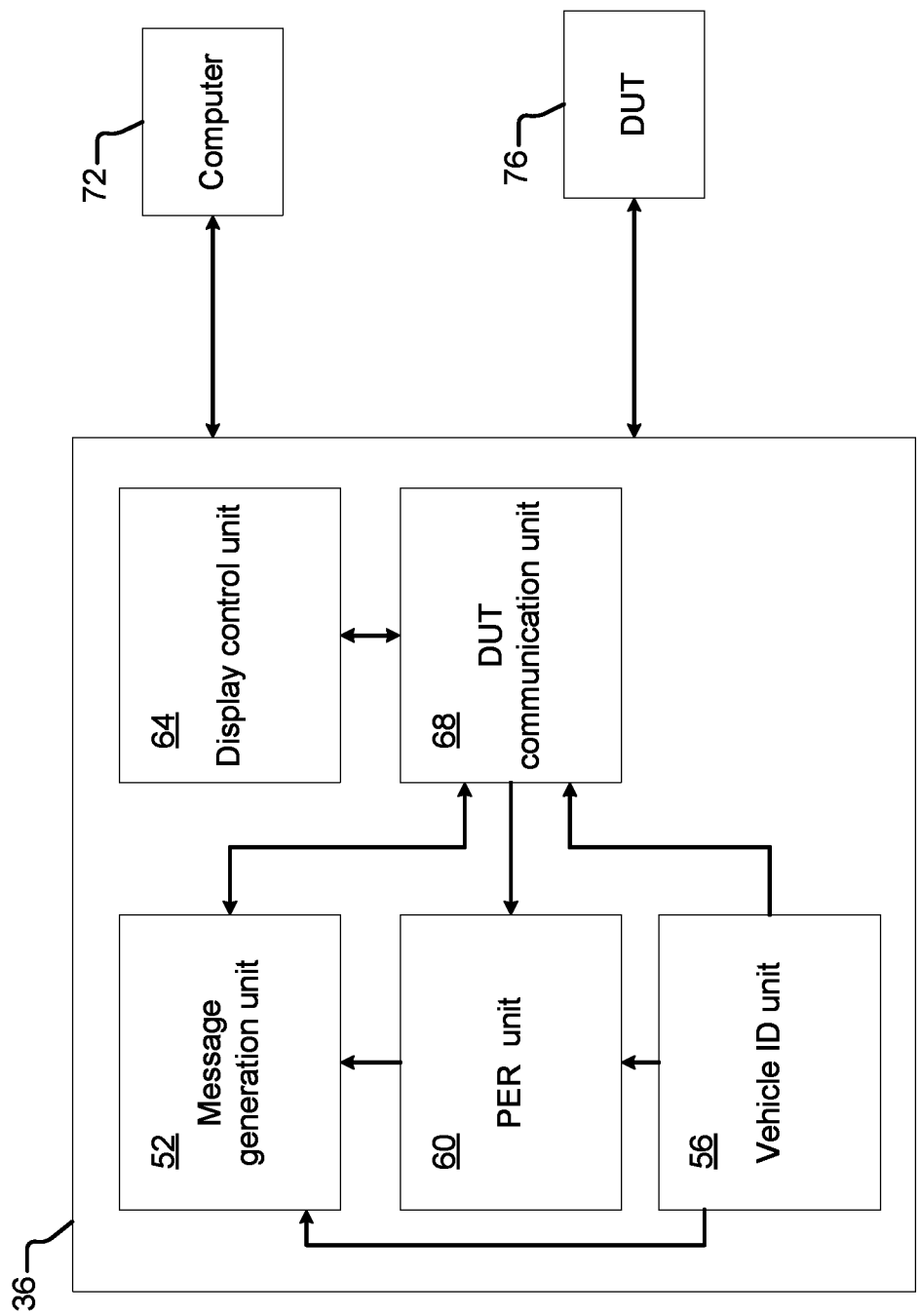
FIG. 3 is a block diagram of a DSRC congestion control certification tool according to the present teachings.

Now referring to FIG. 3, a block diagram of the DSRC congestion control certification tool 36 is pictured. The DSRC congestion control certification tool 36 may include a message generation unit 52, a vehicle identification (ID) unit 56, a packet error rate (PER) unit 60, a display control unit 64, and a device-under-test (DUT) communication unit 68. The DSRC congestion control certification tool 36 communicates with, and receives signals from, both a computer 72, such as a personal computer, a laptop, a tablet, or any other computing device, and a device-under-test (DUT) 76.

During the initial phases of the certification test, the vehicle ID unit 56 receives a total number of emulated vehicles (or remote vehicles) desired for the certification test. The desired number of emulated vehicles becomes a targeted total number of remote vehicles. In some embodiments, the desired number of vehicles may be entered into the computer 72 and communicated to the vehicle ID unit 56. In other embodiments, the desired number of vehicles may be directly entered into the DSRC congestion control certification tool 36 by a user.

The vehicle ID unit 56 creates a unique identifier, a unique DE_TemporaryID value, for each remote vehicle. The unique identifier may be a string of numbers that increment for each remote vehicle or a string of characters that otherwise identify each remote vehicle. The vehicle ID unit 56 communicates the unique identifiers to the DUT communication unit 68 and the message generation unit 52 and targeted total number of remote vehicles to the PER unit 60.

The vehicle ID unit 56 further creates a unique source address and a unique security certificate for each remote vehicle. In some embodiments, the unique source address and the unique security certificate for each vehicle may be configured or customized by the user. In this case, the vehicle ID unit 56 receives the source address and security certificate for each remote vehicle from the computer 72 or directly input into the DSRC congestion control certification tool 36 and passes the source address and security certificate for each remote vehicle to the message generation unit 52. In other embodiments, the unique source address and a unique security certificate for each vehicle are generated by the vehicle ID unit 56 and not configurable by the user. The vehicle ID unit 56 then communicates the unique source address and the unique security certificate for each vehicle to the message generation unit 52.

The message generation unit 52 receives a desired number of transmitted messages per second and a desired packet error rate (PER) for each remote vehicle and a desired channel busy percentage (CBP). The desired variables become target characteristics for the DSRC congestion control certification tool 36. In some embodiments, the desired number of transmitted messages per second, PER, and CBP may be entered into the computer 72 and communicated to the message generation unit 52. In other embodiments, the desired number of transmitted messages per second, PER, and CBP may be directly entered into the DSRC congestion control certification tool 36 by a user. The message generation unit 52 further receives the targeted total number of remote vehicles from the vehicle ID unit 56.

The packet error rate (PER) is a ratio of the number of BSMs not received by the DUT to the number of BSMs sent by a given remote vehicle. The BSM includes the remote vehicle unique identifier (temporary identifier, temp ID), the unique source address, the unique security certificate for the specific vehicle, and a transmitted sequence number (for example only, DE_MsgCount) that is incremented for each transmitted BSM.

The message generation unit 52 achieves the target PER by setting the sequence numbers accordingly. For example, if, in normal operation, a single remote vehicle sends 10 messages to the DUT, the sequence number for the first message may be 1, the sequence number for the second message may be 2, and so on through message 10. A 0% PER is where the DUT receives messages 1-10. However, the DUT will increase the PER where messages are missing. For example, if the DUT receives messages with sequence numbers 1, 3, 5, 7, and 10, the DUT will determine that there is a 50% PER because messages 2, 4, 6, 8, and 9 were not received. Thus, during testing, the message generation unit 52 may achieve the target PER using, for example, one of two methods: (1) the message generation unit 52 generates messages with missing sequence numbers (for example, only generates messages with sequence numbers 1, 3, 5, 7, and 10), or (2) the message generation unit 52 generates messages with sequence numbers 1-10 but only sends messages with sequence numbers 1, 3, 5, 7, and 10 for transmittal to the DUT. Accordingly, the DSRC congestion control certification tool 36 tricks the DUT into believing that there is a PER (i.e. the target PER).

The channel busy percentage (CBP) is the variable that describes the channel congestion. The CBP is the percent time that there are messages on the radio frequency (RF) channel. For example, if the wireless channel can handle 100 messages/second and each message transmitted is 100 bytes, if 2 messages/second are transmitted over the wireless channel, then the CBP is 2%. Thus, the higher the CBP, the higher the channel congestion. For example only, a low congestion condition may have a CBP of 10%, while a high congestion condition may have a CBP of 50% or higher.

The message generation unit 52 may achieve the target CBP by increasing a message size of the BSMs sent over the channel. For example, if the DSRC congestion control certification tool 36 sends 1 message at 100 bytes and the wireless channel can handle 100 messages/second with each message at 100 bytes, the CBP is 10%. If the target CBP is 20%, the message generation unit 52 may increase the message size to 200 bytes.

Further, the message generation unit 52 may achieve the target CBP by generating messages other than BSMs for transmittal to the DUT. For example, the message generation unit 52 may generate WAVE short messages (WSMs) or any other 802.11 message for transmittal. Transmitting messages other than BSMs may be beneficial where an increase in the CBP is necessary but the increase in the CBP needs to be performed independently, without having to emulate additional remote vehicles. Thus, it is not necessary to transmit only BSMs, the message generation unit 52 may generate any message as long as it is transmitted on the same RF channel (and thus causes channel traffic).

The message generation unit 52 creates the BSMs for each unique vehicle identifier to be transmitted at the modified targeted number of BSMs per second. The BSMs that may be generated include, for example, vehicle data (such as latitude, longitude, time, heading angle, speed, lateral acceleration, longitudinal acceleration, yaw rate, throttle position, brake status, traction control status, steering angle, headlight status, wiper status, turn signal status, vehicle length, vehicle width, vehicle mass, bumper height, etc.), weather data (such as ambient temperature, ambient air pressure, rain, etc.), vehicle prediction data (such as path prediction), etc. The BSM unit 52 may randomly create the BSMs for each vehicle identifier, or the BSMs may be created in a pattern or have some relation. The BSM unit 52 then communicates the BSMs for each vehicle identifier to the DUT communication unit 68.

For each BSM, the message generation unit 52 assigns an appropriate sequence number (for example only, DE_MsgCount) to achieve the target PER and generates the message at the appropriate size to achieve the target CBP. The message generation unit 52 further mates the source address and security certificate with each vehicle identifier, generating the BSM for communication to the DUT communication unit 68.

Figure 4A:
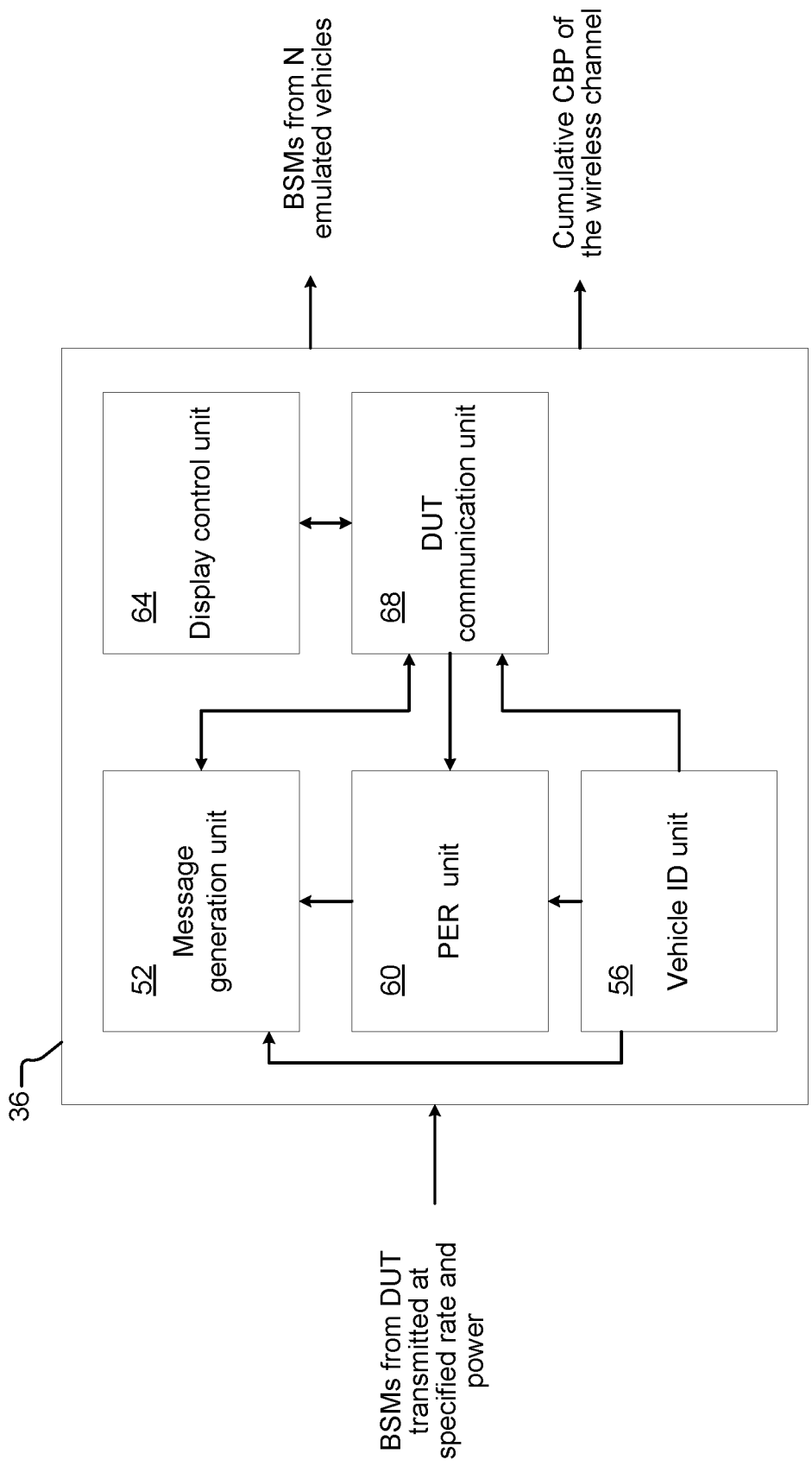
FIG. 4A is a detailed block diagram of a portion of the block diagram in FIG. 3.

The DUT communication unit 68 receives the BSMs for each remote vehicle. The DUT communication unit 68 then transmits each BSM to the DUT 76 at the target messages per second for each vehicle. Thus, the DSRC congestion control certification tool 36 outputs BSMs from the target number of emulated, or remote, vehicles which generate a target PER for each remote vehicle and a cumulative CBP for the wireless channel, as illustrated in FIG. 4A. The BSMs from the target number of emulated, or remote, vehicles and the cumulative CBP for the wireless channel become inputs into the DUT 76, as illustrated in FIG. 4B. In response to the BSMs, PER, and CBP, the DUT 76 transmits BSMs back to the DSRC congestion control certification tool 36 at a specified rate and power.

In response to the number of remote vehicles and/or the CBP detected by the DUT, the DUT may react by adjusting the frequency of BSMs transmitted. For example only, if the DUT detects that there are fewer than 25 remote vehicles, the DUT may transmit BSMs every 10 Hz (or 100 milliseconds). However, if the DUT detects that there are 50 remote vehicles, the DUT may change the BSM transmittal rate to every 2 Hz (or 500 milliseconds).

Additionally, in response to the number of remote vehicles and/or the CBP detected by the DUT, the DUT may react by adjusting the transmittal power of the BSMs transmitted. For example only, if the DUT detects a CBP less than 50%, the DUT may transmit messages at 20 dBm. However, if the DUT detects a CBP greater than 50%, the DUT may reduce the power used to transmit the messages to 10 dBm. Reduction in the power used to transmit the messages decreases the zone of travel for the messages and essentially makes the channel "quieter."

The DUT communication unit 68 in the DSRC congestion control certification tool 36 receives BSMs from the DUT transmitted at the specified rate and power (FIG. 4A). The DUT communication unit 68 may determine the transmit power of the BSM from a value stored within the BSM itself, or the DUT communication unit 68 may measure the received signal strength and compare the signal strength to a known or expected range of values to determine the transmit power. The DUT communication unit 68 may determine the transmit rate based on the frequency that the BSMs are received over-the-air from the DUT.

The DUT communication unit 68 compares the BSM transmit rate and the BSM transmit power for the BSMs sent from the DUT to a target BSM transmit rate and a target BSM transmit power entered by the user (either in the computer 72 or directly into the DSRC congestion control certification tool 36). If the BSM transmit rate and BSM transmit power meet or exceed the respective target values, the DUT communication unit 68 determines that the DSRC system 20 on the DUT passes the certification test. If the BSM transmit rate and BSM transmit power do not meet or exceed the respective target values, the DUT communication unit 68 determines that the DSRC system 20 on the DUT fails the certification test The DUT communication unit 68 transmits the various measured statistics for the transmissions from the DUT to the display control unit 64 for display to a user. The display control unit 64 either displays on the DSRC congestion control certification tool 36 or provides signals to the computer 72 for display of the measured statistics. For example, the DSRC congestion control certification tool 36 or the computer 72 may display the status information for the test apparatus and the remote vehicle state, such as PER, CBP, Message Transmit Rate, etc., and the DSRC congestion control certification tool 36 or the computer 72 may display the status information about the DUT results, such as BSM transmit rate and BSM transmit power and whether the DSRC system 20 passes or fails the certification test.

Figure 5:
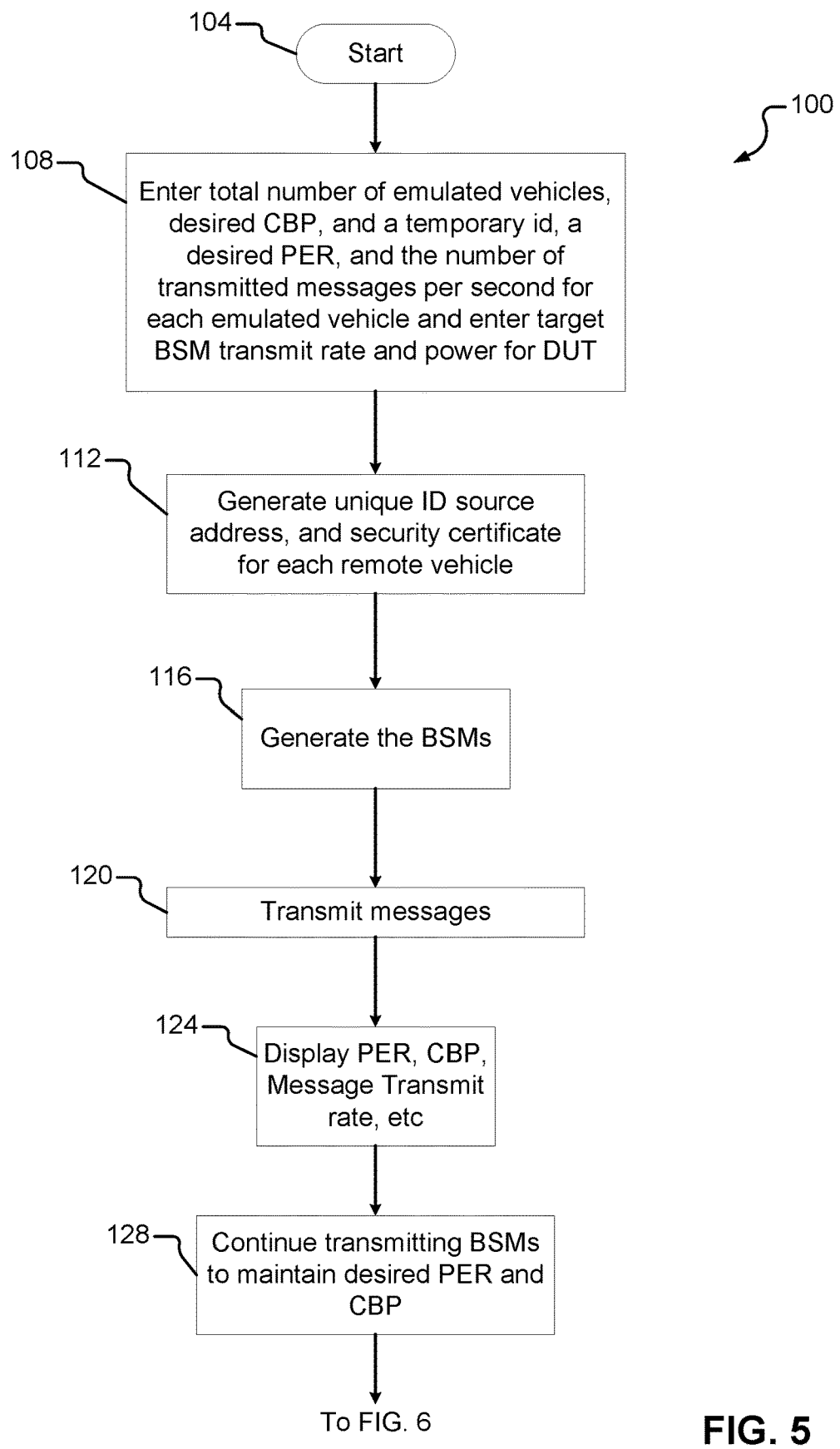
FIG. 5 is a flow chart for a certification method according to the present teachings.
Figure 6:
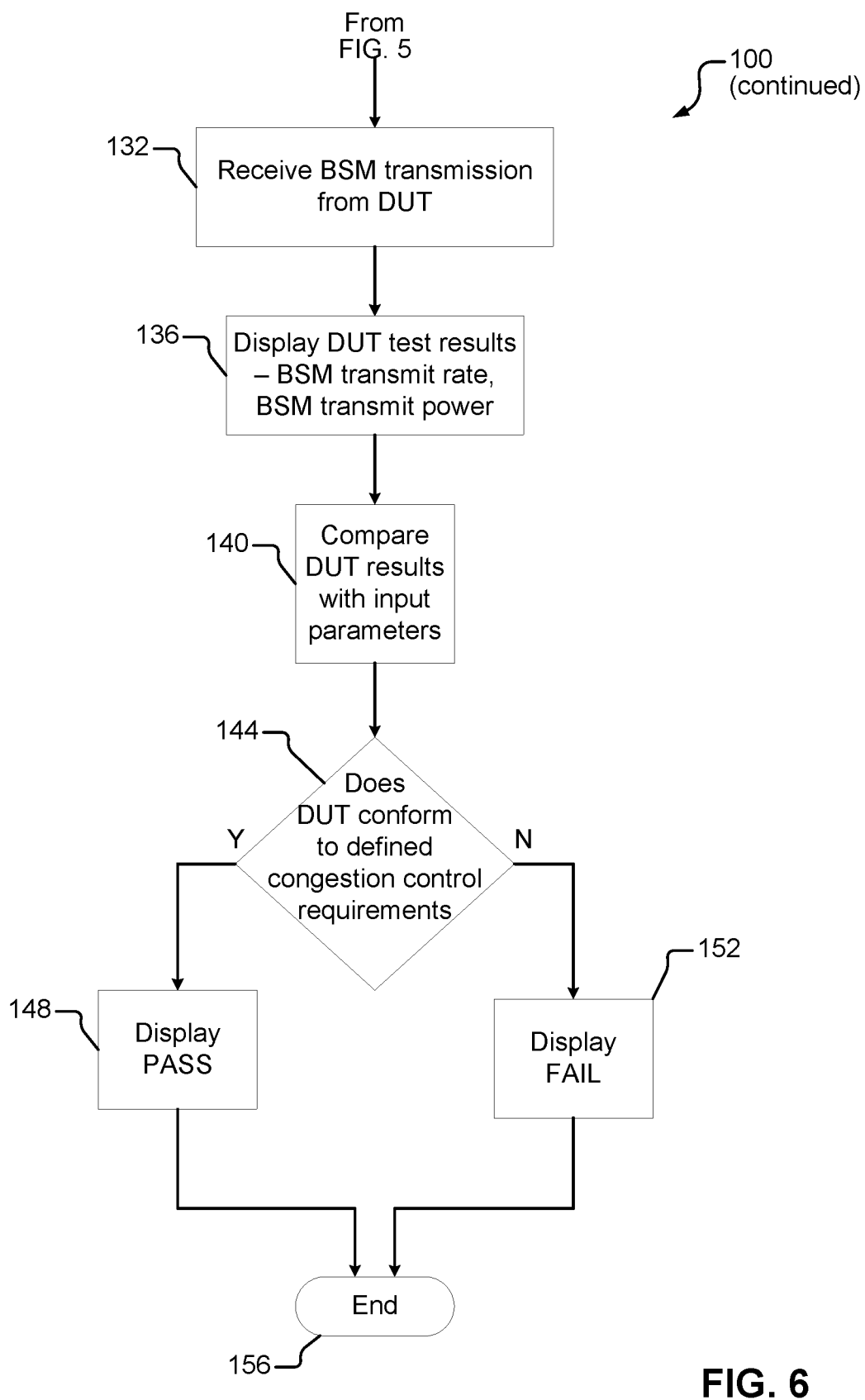
FIG. 6 is a continuation of the flow chart in FIG. 5.

Now referring to FIGS. 5 and 6, a flow chart for an efficient DSRC congestion certification method 100 is illustrated. The method 100 starts at 104 (FIG. 5). At 108, a user is prompted to enter a total number of emulated vehicles (or remote vehicles), a desired CBP, a desired PER, and a desired number of transmitted messages per second for each remote vehicle, and a target BSM transmit rate and a target BSM transmit power for the DUT. Optionally, the user may also be able to insert (and customize) a unique ID, a source address, and a security certificate for each remote vehicle. The total number of emulated vehicles (or remote vehicles), the desired CBP, the desired PER, and the desired number of transmitted messages per second become a targeted total number of remote vehicles, a target CBP, a target PER, and a target number of transmitted messages per second.

At 112, the DSRC congestion control certification tool 36 generates unique vehicle identifiers for the remote vehicles. The unique identifier may be a string of numbers that increment for each remote vehicle or a string of characters that otherwise identify each remote vehicle. If they were not input by the user, the DSRC congestion control certification tool 36 further creates a unique source address and a unique security certificate for each remote vehicle.

At 116, the DSRC congestion control certification tool 36 generates the BSMs for transmission. BSMs are created for each unique vehicle identifier to be transmitted at the modified targeted number of BSMs per second. The BSMs that may be generated include, for example, vehicle data (such as latitude, longitude, time, heading angle, speed, lateral acceleration, longitudinal acceleration, yaw rate, throttle position, brake status, traction control status, steering angle, headlight status, wiper status, turn signal status, vehicle length, vehicle width, vehicle mass, bumper height, etc.), weather data (such as ambient temperature, ambient air pressure, rain, etc.), vehicle prediction data (such as path prediction), etc. The BSMs for each vehicle identifier may be randomly created, or the BSMs may be created in a pattern or have some relation.

For each BSM, an appropriate sequence number (for example only, DE_MsgCount) is assigned to achieve the target PER and the message is generated at the appropriate size to achieve the target CBP. As previously stated, the target PER may be achieved by using, for example, one of two methods: (1) generating messages with missing sequence numbers (for example, only generating messages with sequence numbers 1, 3, 5, 7, and 10), or (2) generating messages with sequence numbers 1-10 but only sending messages with sequence numbers 1, 3, 5, 7, and 10 for transmittal to the DUT. The target CBP may be achieved by, for example, either (1) by increasing a message size of the BSMs sent over the channel, or (2) by generating messages other than BSMs for transmittal to the DUT (for example, generating WSMs or any other 802.11 message for transmittal). The message generation unit 52 further mates the source address and security certificate with each vehicle identifier, generating the BSM for communication to the DUT communication unit 68.

At 120, the DSRC congestion control certification tool 36 transmits the BSMs across the channel to the DSRC system 20 of the host vehicle 10 (i.e., the DUT 76). As previously stated, while the transmitted messages are discussed in terms of BSMs only, messages other than BSMs (for example, WSMs or any other 802.11 message) may be transmitted to achieve target CBP. Thus, it is not necessary to transmit only BSMs, any message may be transmitted as long as it is transmitted on the same RF channel (and thus causes channel traffic).

At 124, the DSRC congestion control certification tool 36 displays the PER, CBP, message transmission rate, and other DSRC congestion control certification tool 36 parameters. The DSRC congestion control certification tool 36 either displays the test information on the DSRC congestion control certification tool 36, itself, or provides signals to the computer 72 for display.

At 128, the DSRC congestion control certification tool 36 continues to transmit the BSMs to maintain the desired channel congestion. At 132, the DSRC congestion control certification tool 36 receives BSMs from the DUT 76. The DSRC congestion control certification tool 36 monitors the BSM transmission rate and transmission power for the BSMs transmitted by the DSRC system 20 of the DUT 76. As previously explained in detail, the transmit power may be determined from a value stored within the BSM itself, or the received signal strength may be measured by the DSRC congestion control certification tool 36 and compared to a known or expected range of values. The transmit rate may be determined based on the frequency that the BSMs are received over-the-air from the DUT.

At 136, the DSRC congestion control certification tool 36 displays the results of the DUT test, including the BSM transmission rate and the BSM transmission power. At 140, the DSRC congestion control certification tool 36 compares the BSM transmission rate and the BSM transmission power with the target BSM transmission rate and target BSM transmission power to determine whether the DSRC system 20 passes the certification test. If the BSM transmit rate and the BSM transmit power are greater than or equal to the target BSM transmit rate and target BSM transmit power, the DSRC system 20 of the DUT 76 conforms to the defined congestion control requirements.

At 144, the DSRC congestion control certification tool 36 determines whether the DSRC system 20 conforms to the defined congestion control requirements. If true, the DSRC congestion control certification tool 36 displays a pass at 148. If false at 144, the DSRC congestion control certification tool 36 displays a fail at 152. The method 100 ends at 156.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A certification tool configured to communicate with a dedicated short range communication system on a test vehicle, the certification tool comprising:
    a vehicle identification unit that generates unique vehicle identifications for a target number of remote vehicles;
    a message generation unit that generates messages at a target number of transmitted messages per second for each remote vehicle; and
    a communication unit that communicates the messages to the test vehicle to achieve a target congestion level.

2. The certification tool of claim 1, wherein the message generation unit generates messages at a target packet error rate and a target channel busy percentage.

3. The certification tool of claim 2, wherein the message generation unit achieves the target channel busy percentage by adjusting a message size of the messages.

4. The certification tool of claim 2, wherein the message generation unit achieves the target channel busy percentage by generating basic safety messages and messages other than basic safety messages for transmission to the test vehicle.

5. The certification tool of claim 2, wherein the message generation unit generates messages with missing sequence numbers to achieve the target packet error rate.

6. The certification tool of claim 2, wherein the message generation unit achieves the packet error rate by generating messages with sequential sequence numbers but only sending a portion of the generated messages for transmittal to the test vehicle.

7. The certification tool of claim 1, wherein the communication unit receives basic safety message transmissions from the test vehicle and determines a basic safety message transmission rate and a basic safety message transmission power for each basic safety message from the test vehicle.

8. The certification tool of claim 1, wherein the target congestion level is a target channel busy percentage, and the target channel busy percentage is achieved by adjusting a message size of the messages or by generating basic safety messages and messages other than basic safety messages for transmission to the test vehicle.

9. The certification tool of claim 1, further comprising a display control unit that displays status information related to the certification test and remote vehicle state and displays a basic safety message transmission rate and a basic safety message transmission power for basic safety messages transmitted from the test vehicle.

10. The certification tool of claim 9, wherein the communication unit determines the basic safety message transmission rate and the basic safety message transmission power for the test vehicle from information contained in the basic safety messages sent by the test vehicle.

11. The certification tool of claim 9, wherein the communication unit determines the basic safety message transmission power by measuring a received signal strength and comparing the signal strength to a known or expected range of values.

12. The certification tool of claim 9, wherein the communication unit compares the basic safety message transmission rate and the basic safety message transmission power for the test vehicle to a target basic safety message transmission rate and a target basic safety message transmission power, if the basic safety message transmission rate and the basic safety message transmission power for the test vehicle meet or exceed the target basic safety message transmission rate and the target basic safety message transmission power, respectively, the display control unit displays a pass indicator, and if the basic safety message transmission rate and the basic safety message transmission power for the test vehicle do not meet or exceed the target basic safety message transmission rate and the target basic safety message transmission power, respectively, the display control unit displays a fail indicator.

13. The certification tool of claim 1, wherein the vehicle identification unit either commands a user to input a unique source address and a unique security certificate for each remote vehicle or generates a unique source address and a unique security certificate for each remote vehicle.

14. A method for certifying a dedicated short range communication system on a test vehicle, the certification method comprising:
   generating, by a certification tool, a unique vehicle identification for each of a target number of remote vehicles;
   generating, by the certification tool, a plurality of messages at a target number of transmitted messages per second for each of the remote vehicles; and
   communicating, by the certification tool, the plurality of messages to the test vehicle to achieve a target congestion level.

15. The certification method of claim 14, further comprising generating, by the certification tool, messages at a target packet error rate and a target channel busy percentage.

16. The certification method of claim 15, further comprising achieving the target channel busy percentage by adjusting, by the certification tool, a message size of the messages or by generating by the certification tool, basic safety messages and messages other than basic safety messages for transmission to the test vehicle.

17. The certification method of claim 15, further comprising achieving the target packet error rate by generating, by the certification tool, messages with missing sequence numbers or by generating, by the certification tool, messages with sequential sequence numbers but only sending a portion of the generated messages for transmittal to the test vehicle.

18. The certification method of claim 14, further comprising receiving, from the test vehicle, basic safety message transmissions and determining, by the certification tool, a basic safety message transmission rate and a basic safety message transmission power for the basic safety messages from the test vehicle.

19. The certification method of claim 14, further comprising displaying, by the certification tool, status information related to the certification test and remote vehicle state and displaying a basic safety message transmission rate and a basic safety message transmission power for the test vehicle.

20. The certification method of claim 19, further comprising:
   comparing, by the certification tool, the basic safety message transmission rate and the basic safety message transmission power for the test vehicle to a target basic safety message transmission rate and a target basic safety message transmission power;
   displaying, by the certification tool, a pass indicator if the basic safety message transmission rate and the basic safety message transmission power for the test vehicle meet or exceed the target basic safety message transmission rate and the target basic safety message transmission power, respectively; and
   displaying, by the certification tool, a fail indicator if the basic safety message transmission rate and the basic safety message transmission power for the test vehicle do not meet or exceed the target basic safety message transmission rate and the target basic safety message transmission power, respectively.

* * * * *